United States Patent [19]

Brand et al.

[11] Patent Number: 4,732,004
[45] Date of Patent: Mar. 22, 1988

[54] PROCESS FOR PURIFYING AND DEAERATING THE CONDENSATE/FEED WATER IN THE CIRCULATION SYSTEM OF A POWER-GENERATING PLANT

[75] Inventors: Andreas Brand; Helmut Lang, both of Wettingen, Switzerland

[73] Assignee: BBC Brown, Boveri & Company Limited, Baden, Switzerland

[21] Appl. No.: 631,767

[22] Filed: Jul. 17, 1984

[30] Foreign Application Priority Data

Jul. 19, 1983 [CH] Switzerland .................. 3943/83

[51] Int. Cl.$^4$ .............................................. F01K 13/02
[52] U.S. Cl. ........................................ 60/646; 60/657
[58] Field of Search ................................. 60/646, 657

[56] References Cited

U.S. PATENT DOCUMENTS 4,055,048 10/1977 Reed ........................................ 60/646
4,237,691 12/1980 Bodmer .................................... 60/646

Primary Examiner—Allen M. Ostrager
Attorney, Agent, or Firm—Oblon, Fisher, Spivak, McClelland & Maier

[57] ABSTRACT

In a process for purifying and deaerating the feed water line in the circulation system of a power-generating plant heated by nuclear power, the following steps are carried out in order to solve acute problems of steam-generator corrosion:

(a) when the preheater train is filled, with the steam-generator isolating valve (40) closed, the condensate flows several times via a recirculation line (37, 52, 53) back to the condensate-collecting vessel (6) and to the condensate purification apparatus (9);

(b) below the water level (7) in the condensate-collecting vessel (6), a deaerating medium (37,38,39) is introduced into the condensate via spray nozzles, rises in the condensate and forms in the deaerating chamber (44), as result of displacement of the air present in its, a cushion which is conducive to oxygen deaerating;

(c) the steam produced during deaerating is precipitated in an additional condenser (48) which is located in the venting line upstream of the vacuum pump (47) and which is subjected to a secondary cooling water; and (d) following the start of steam generation and during the low-load period, subsequent deaerating is carried out by means of steam in the collecting vessel of the condenser. As a result, it is possible to provide purified and deaerated feed water over the entire operating range and to reduce to a minimum the deaerating time before the plant is started.

12 Claims, 1 Drawing Figure

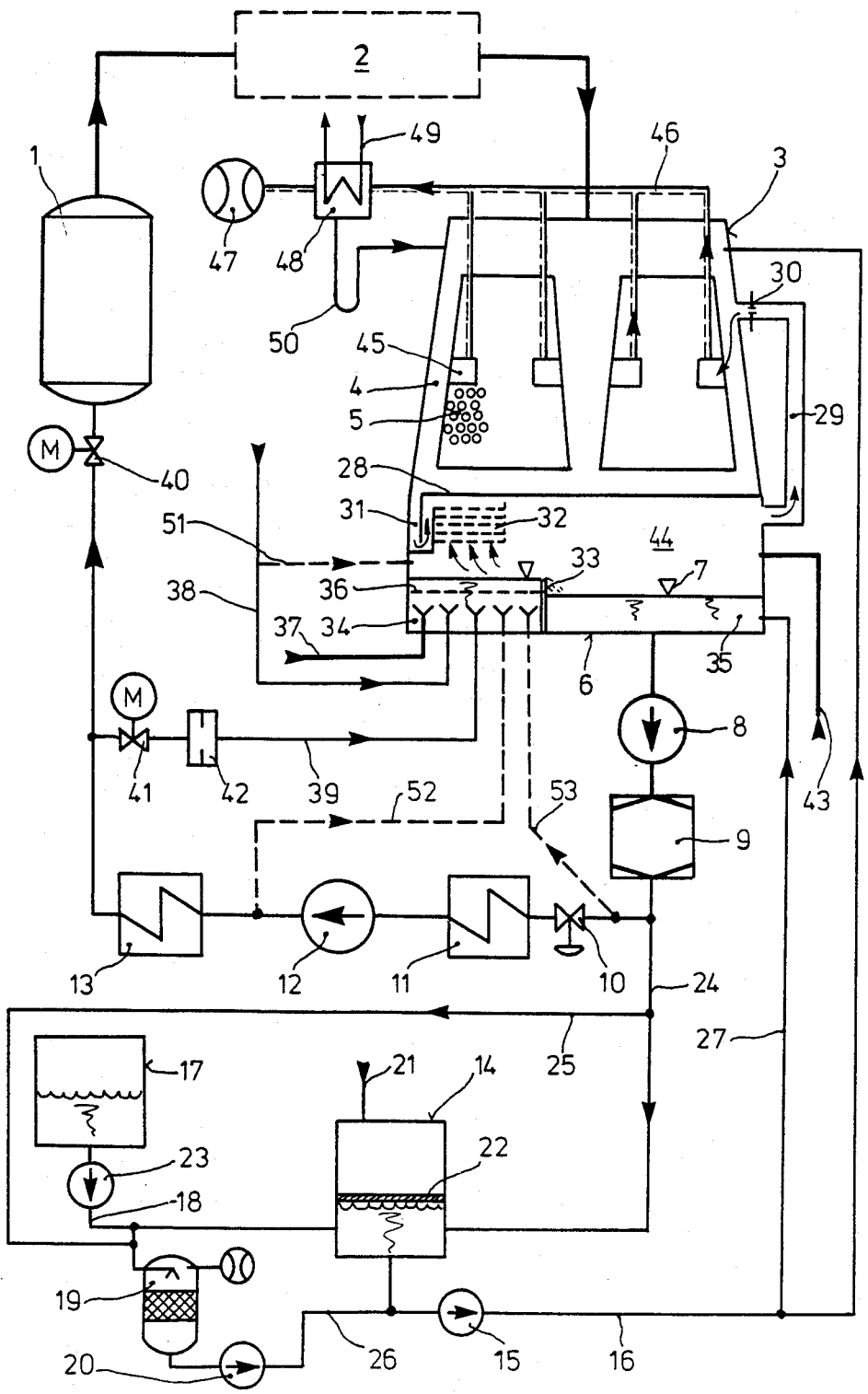

PROCESS FOR PURIFYING AND DEAERATING THE CONDENSATE/FEED WATER IN THE CIRCULATION SYSTEM OF A POWER-GENERATING PLANT

FIELD OF THE INVENTION

The invention relates to a process for purifying and deaerating the condensate/feed water in the circulation system of a power-generating plant. A main circuit consists essentially of a steam generator, a turbine, a condenser, a condensate purification system, low-pressure and high-pressure preheaters, and the necessary circulation pumps. A secondary circuit includes preparation, deaerating, and storage capacities for the cold condensate and the make-up water.

BACKGROUND OF THE INVENTION

Oxygen dissolved in the feed water, dissolved copper, and further corrosion products carried along by the feed water have recently been identified as the promoters of corrosion in steam generators of pressurized-water reactor installations. Consequently, there have recently been great efforts to keep the oxygen content in the feed water as low as possible, to eliminate dissolved copper by removing all pipes made of copper alloys from the feed water circulation system, and to separate out corrosion products before they reach the steam generator. These efforts are all the greater because the replacement of steam generators in a power station in the 1,000-MW class results in costs of approximately 100 million dollars. In addition, a reduction in the oxygen content of the feed water lessens the corrosion in the feed water line and the preheaters.

Oxygen is dissolved in the feed water or in the condensate when air comes in contact with the water. For example, this occurs:

in the cold-starting of a plant, since all parts of plant are under air pressure before being filled condensate, and it is not possible to remove all the air from the feed water/steam circulation system by means of starting evacuation;

during low-load operation, since, for economic reasons and because of practical problems, the suction capacity of the vacuum pumps for the incoming air cannot be made so great that all the parts of the condense bundle are sufficiently scavenged with steam;

during normal load operation, because, despite a sufficient suction capacity, the concentration of air becomes so great towards the end of condensation (that is to say, towards the air cooler) that measurable oxygen concentrations are obtained;

because even in normal load operation very many condenser designs have zones in which accumulations of air occur; and because, during the preparation of the make-up water, the purified demineralized make-up water is flushed with air to expel carbon dioxide, and it is therefore saturated 100% with air.

Copper is dissolved from the wetted metal surfaces of cooper alloys, for example in the presence of ammonia and oxygen, or else is introduced into the feed water as the result of erosion or corrosion of these metal surfaces. Corrosion products and further impurities accumulate in the feed water mainly during shutdown periods.

Experts take the view, at the present time, that it is necessary to aim for a maximum oxygen content of $\leq 10$ ppb (parts per billion) over the entire operating range of the plant.

In a load range between 40 and 100%, oxygen contents of $\leq 5$ ppb in the condensate have been detected in good condensers, that is to say those with a proven good deaerating capability. In this case, the make-up water is deaerated in the condenser itself. However, approximately 70 ppb have been measured in the hot well of the condenser during the cold-starting of such a plant and in low-load operation. These oxygen contents should be reduced further.

To solve the corrosion problem, the following proposals were discussed at the EPRI condenser seminar in June 1983 in Orlando, Fla.:

(a) Starting deaerating and low-load deaerating by spraying the recirculated feed water via the condenser tubes. This idea is successful only when the available suction capacity becomes greater than the suction capacity required for oxygen contents of $\leq 10$ ppb. This can be expected only in the case of loads beyond 30 to 40%, since the spraying of heated-up condensate via the condenser bundles has the desired effect only when the feed water does not pass through any zones of greater air concentrations over the entire path of this condensate. It is also impossible to purify the entire feed water circulation system by recirculating the condensate.

(b) Increasing the suction capacity in the low-load range by reducing the steam content in the suction stream by means of co-condensation. However, co-condensation can only condense some of the steam from the suction mixture, and the suction device still always has to suck up all the air. This is generally possible only at condenser pressures which are above the "no-load pressure" of the condenser.

(c) Subsequent deaerating of the condensate in the hot well by means of packing inserts or by blowing in steam below the water level. This idea will be successful only when sufficient steam is available for being blown in and for heating up the condensate to saturation temperature. This necessitates an external steam source during the cold-starting of the plant. Also, when packed units are used, sufficient height must be available for the packing inserts; when steam is blown in, there must be sufficient covering of the condensate and sufficiently fine steam distribution in the condensate. This solution likewise fails to provide for purification of the feed water circulation system.

OBJECT OF THE INVENTION

The object principal of the invention is to bring about effective purification and deaerating of the condensate and feed water, necessitated particularly because of steam-generator corrosion problems, prior to the normal operating load.

SUMMARY OF THE INVENTION

An especially favorable solution is found by means of the invention. In this solution:

(a) purified and deaerated feed water is provided over the entire operating range;

(b) thermal deaerating is possible without the aid of separate facilities, such as, for example, auxiliary steam, so that before steam generation there is largely no need for the provision of, for example, gland-sealing steam or preservation steam; and (c) the time for deaerating before the plant is started up can be reduced to a minimum.

BRIEF DESCRIPTION OF THE DRAWING

An exemplary embodiment of the invention is shown diagrammatically in the drawing. None of the plant parts unimportant for an understanding of the invention, such as, for example, the actual steam circuit and the many self-evident shut-off fittings in the lines, are shown. The direction of flow of the various media is indicated in each case by arrows.

DETAILED DESCRIPTION OF THE PRESENTLY PREFERRED EMBODIMENT 1 denotes a steam generator heated by nuclear power. In normal operation, the saturated steam produced in it is expanded to the condenser pressure in the turbine installation 2, which is not shown in detail. In a condenser 3, the steam in a condensation space 4 is precipitated on the water-cooled tube bundles 5. The condensate is collected in the condensate-collecting vessel (hot well) 6. The level triangles indicate the water level 7 in the hot well 6. A condensate pump 8 conveys the condensate through a condensate purification apparatus 9, from where it passes via a hot-well regulating valve 10 into a low-pressure preheater 11, only one of which is represented symbolically. It is also assumed for the purpose of the present example that the relevant plant has no combination preheater and therefore also no conventional combination-preheater/deaerator stage. Accordingly, it is a plant such as is encountered frequently in the USA. From the low-pressure preheater 11, a feed pump 12 conveys the feed water to the steam generator 1 via a high-pressure preheater 13, of which again only one is shown.

The water losses occurring in operation at normal rating as a result of leakage and elutriation are on the order of magnitude of 1% of the circulation quantity. These losses are made up from a cold-condensate vessel 14, from which they are introduced into the condensation space 4 of the condenser 3 through a cold-condensate line 16 by means of a feed pump 15. It goes without saying that there is no need for the feed pump 15 if the vessel 14 is located at an appropriate height. The vessel 14 obtains its content from a make-up water vessel 17 via a make-up water line 18 with a feed pump 23 located in it. During the preparation of the make-up water (not shown), the demineralised water is flushed with air to expel carbon dioxide. Consequently, the make-up water is as a rule saturated 100% with air and therefore correspondingly with oxygen. However, this does not have any effect in the case of normal load operation of the plant (which is still being considered), since the condensation space 4 is scavenged so thoroughly that the deaerating of this small quantity of make-up water can be carried out in the condenser 3 itself.

Of course, the cold-water system contains a conventional vacuum deaerator 19 which is connected on the in-flow side to the make-up water line 18 and on the outflow side via a feed pump 20 in a deaerator outflow line 26 to the cold-condensate line 16. Via the vacuum deaerator 19, it is possible, on the one hand, initially to deaerate the make-up water from the vessel 17 to be introduced fresh into the cold-condensate vessle 14 and, on the other hand, if necessary, to circulate and thus deaerate the content of the cold-condensate vessel 14. To prevent the water, once deaerated, in the cold-condensate vessel 14 from absorbing oxygen, an inert-gas atmosphere is generated above the water level. A nitrogen connection suitable for this purpose is denoted by 21. A floating cover 22 can also protect the condensate surface against the effects of oxygen in the event of an accidental inrush of air. The latter measure can be taken in isolation or simulataneously with the first-mentioned measure.

The vacuum deaerator 19 is put to a third intended use when, for example, the entire content of the condensate-collecting vessel is to be deaerated. This can arise, for example, after an emergency cut-off when the vacuum in the condenser 3 is destroyed. In this case, via a condensate return 24 which branches off in the feed line downstream of the condensate purification apparatus 9 and which discharges into the cold-condensate vessel 14, the condensate to be deaerated is branched off before this discharge point and is conveyed into the vacuum deaerator 19 via a line 25. After deaerating, this water is pumped into the cold-condensate line 16 via the deaerator outflow line 26 and from here is returned to the condensate-collecting vessel 6 via a so-called starting filling line 27 which branches off from the cold-condensate line 26.

The condensate-collecting vessel 6 is separated from the condensation space 4 by an intermediate bottom 28. The two spaces are connected to each other by means of a steam equalization line 29 which is provided with an orifice plate 30 towards the condensation space 4. The condensate arising at the tube bundles 5 first collects on the intermediate bottom 28 and then flows vertically downwards into a syphon 31 via a slit-shaped condensate flow-off orifice directly adjacent to the wall of the condenser 3. At the top end of the rising syphon channel, the condensate is conveyed onto packing inserts 32. The packing inserts 32 consist of a plurality of perforated drop-off plates arranged at a distance above one another. During operation, the condensate trickling downwards from above is heated to saturation temperature by the rising steam. This steam can come from an auxiliary turbine (not shown) or another device and is introduced via a steam line 43 into the condensate collecting vessel above the water level 7. The condensate collects on the condenser bottom, which is subdivided into a lefthand compartment 34 and a righthand compartment 35 by means of a baffle 33. This is necessary, on the one hand, to create appropriate flow conditions to the condensate pump 8 and, on the other hand, so as not to impair level adjustment.

In the left-hand compartment 34, which is located directly underneath the packing inserts 32 and which is equipped with an overflow to the right-hand compartment 35, there are below the water level inserts 36 for smoothing the water level. The inserts 36 serve, among other things, for making those media introduced from below into the left-hand compartment 34 of the collecting vessel 6 assume homogeneity and follow the same direction. The inserts 36 can be either baffles or perforated cover plates.

The media to be introduced are, on the one hand, steam which is blown in via a steam feed line 37 in the starting phase (and, in the case of condensers with a poor deaerating capability, even during normal load operation) and, on other hand, either an inert gas (for example nitrogen, which flows in via a nitrogen line 38) or feed water from a feed water recirculation line 39. In the present case, by an inert gas is meant a gas which is dissolved only in insignificant traces in the condensate.

The recirculation line 39 branches off from the feed line, specifically immediately upstream of a steam-generator isolating valve 40. The recirculation line 39 is provided with a shut-off member 41 and a throttle member 43, the former advantageously being located as near as possible to the branch-point.

The free space in the condensate-collecting vessel 6 between the water level 7 and intermediate bottom 28 is referred to below as a deaerating chamber 44.

Accommodated within the bundles 5 are air-cooler zones 45 known per se, from which the non-condensible gases, together with a certain proportion of steam, are drawn off via venting lines 46. This is carried out by means of a vacuum pump 47. Located upstream of the vacuum pump 47 in the venting line 46 is an additional condenser 48 operated with secondary cooling water 49 which is preferably colder than the main cooling water for the condenser 3. The additional condenser 48 is drained into the main condenser 3 via a syphon 50.

The purification and deaerating process is now described with reference to the operation of filling and starting the plant.

It is assumed here that the plant is completely empty. The plant is first evacuated by means of the vacuum pump 47, the shut-off member 41 in the recirculation line 39 is closed, the steam-generator isolating valve 40 is closed, and the contents of the cold-condensate vessel 14 is circulated via the vacuum deaerator 19 for the purpose of separating oxygen. By means of the feed pump 15, the condensate is conveyed via the cold-condensate line 16 and the starting filling line 27 into the condensate-collecting vessel 6, from where it continues to flow into the preheater train (8–13). Advantageously, the entire preheater train is filled up to a point immediately in front of the closed steam-generator isolating valve 40. The shut-off member 41 in the recirculation line 39 is then opened. Because the system is filled up with oxygen-free condensate, on the one hand the time for deaerating before the plant is started up can be reduced and on the other hand corrosion of the preheater train during the filling operation can be prevented.

The condensate pump 8 now circulates the water with the minimum condensate-pump quantity, that is to say approximately 30% of the rated-load quantity. Because the total quantity of water passes through the condensate purification apparatus 9 repeatedly, approximately 10 cycles are sufficient to eliminate the corrosion products which have formed and accumulated in the feed water circulation system upstream of the steam-generator 1, especially during the plant shutdown period.

Although the feed water now has the necessary quality as regards purity, it has nevertheless become enriched with oxygen during multiple circulation, since it is impossible to remove all the air from the circulation system at the time of starting evacuation.

The deaerating required can now be carried out in two ways which are both illustrated in the drawing:

On the one hand, inert gas, for example nitrogen, can be introduced into the condensate-collecting vessel 6. This is effected advantageously via the nitrogen line 38 which discharges below the water surface into the left-hand compartment 34 of the condensate-collecting vessel 6. The nitrogen rises up through the water, and, because of the diffusion effect known per se, the oxygen is at the same time extracted from the condensate. The nitrogen collects in the deaerating chamber 44 and thereby forces that air still present between the water surface 7 and the intermediate bottom 28 through the steam equalization line 29 into the condensation space 4, from which it is drawn off via the venting lines 46. Consequently, as a result of this first measure, an actual space low in oxygen can be provided in the deaerating chamber 44. This space could also be provided not by conveying the inert gas through the condensate, as just explained, but by ensuring that it flows directly into the deaerating chamber 44, as indicated by a nitrogen line 51 represented by a broken line. However, the above-mentioned advantage of direct water deaerating is lost as a result.

The second method is thermal deaerating within the condensate-collecting vessel 6. According to this, particularly favorable conditions for deaerating are provided as a result of the supply of energy to the condensate. In this case, the heat source should be such that small steam bubbles rise up uniformly through the water. Two possibilities must likewise be considered in the second method:

In the first place, the solution which belongs to the state of the art and in which auxiliary steam is blown in. However, this results in the disadvantage, already mentioned in the introduction, that a steam source must be available at this early stage, that is to say before the start of steam generation. This steam is introduced into the condensate via the steam feed line 37.

In the second solution, the heat required for deaerating is obtained, without special devices for energy supply (for example, auxiliary steam or electrical heating), by recirculating the feed water to the condensate-collecting vessel 6. The feed pump 12 is put into operation for this purpose. It is known that, in a turbine plant of the order of magnitude of approximately 1,000 MW, the feed pump requires 2 MW in minimum-rate operation and converts this completely into pressure and heat. From this, it is easy to discover that the circulation system will be heated up to saturation temperature after approximately 10 hours. So as not have to take the feed water recirculation line 39 through the power station at the full final feed water pressure, the pressure is partly reduced in the throttle member 42. The feed water recirculation line 39 can thus be designed for a lower pressure. Of course, an actual pressure-limiting system (for example, a breaking disc or safety valve) can also be provided in the feed water recirculation line 39. With the remaining pressure, the condensate which is at saturation temperature in the left-hand compartment 34 below the condensate level 7 is now injected via nozzles or perforated pipes. As a result of the pressure reduction occurring in the spray nozzles, some of the condensate introduced evaporates at a suitable temperature to form the small steam bubbles necessary for deaerating. A steam cushion likewise forms above the water surface in the deaerating chamber 44 and forces the air which has remained till then through the steam equalization line 29.

It is particularly advantageous if both deaerating methods are used. It is appropriate, for this purpose, first to provide a nitrogen cushion in the deaerating chamber 44 in the initial phase, specifically for as long as there is no steam formation as a result of thermal deaerating.

Together with the condenser venting, the steam flowing off via the steam equalization line 29 is drawn off and precipitated in the additional condenser 48.

When feed water deaerating has been carried out to the necessary level, for example to an oxygen content of less than 10 ppb, which can be determined by simple measurement in or downstream of the condensate-collecting vessel 6, the primary purification and deaerating phase is thus completed. The filling of the steam generator 1 then follows, with subsequent steam generation. When not in use, the feed water recirculation line 39 must be closed by blocking the shut-off member 41 firmly.

Two advantages of the process can now be seen, namely, firstly that deaerating in starting-up operation is possible even when the turbine glands are not yet shut off, and secondly that the only heat sink used up to this moment has been the additional condenser 48 operated with secondary cooling water 49, and therefore it has been possible to do without the main cooling water.

The main cooling water is only put into operation when it is necessary to eliminate heat, this being the case in the plant starting phase (which now begins). The run-up phase and the turbine bypass requried for this are not essential to the invention and can be ignored in the present context.

It is now assumed that the system is operating under a certain part load. For condensation, just that quantity of cooling water which is absolutly necessary is now circulated. Up to a specific part load, only part (for example, half) of the condenser is preferably put into operation, since at this stage as high a pressure as possible is desirable in the condensation space 4 in order to maintain fully and utilize the suction capacity of the vacuum pump 47. This means that the inflowing steam does not condense out completely in the condensation space 4, but fills the space and at the same time displaces the air which is still present. The air/steam mixture drawn off via the venting lines 46 first flows through the additional condenser 48 which, as already mentioned, is operated with secondary cooling water 49, which is preferably at a lower temperature than the main cooling water. As a result of the reduction in the steam content in the additional condenser 48, the venting capacity of the vacuum pump 47 is effectively increased. This is advantageous particularly because in low-load operation the vacuum pump 47 usually has insufficient suction capacity. The condensate precipitated in the additional condenser 48 is returned to the main condenser 3. Because of the pressure difference between the additional condenser 48 and the condensation space 4, the syphon 50 is arranged in the line provided for this purpose.

However, in the operating phase just described, the tube bundles 5 still contain air zones in which the condensate produced is enriched with oxygen, because the suction capacity is still not yet sufficient. Consequently, it is necessary to carry out subsequent deaerating in the condensate-collecting vessel 6. If the condenser 3 is provided with the packing inserts 32, subsequent deaerating can be carried out in the packing inserts 32 by the method already mentioned, and the steam required for heating is conveyed via the steam line 43 into the deaerating chamber 44 and underneath the packing inserts 32. The exhaust steam from the feed-pump drive turbine or bleed steam is preferably used for this purpose.

However, for subsequent deaerating, the best solution is to introduce fresh steam or bleed steam via the steam feed line 37 which was used, where appropriate, for the purpose of introducing steam at the time of first deaerating. To form small steam bubbles, the steam feed line 37 will also be provided with nozzles or perforated pipes at its mouth. So that the steam cushion forming in the deaerating chamber 44 does not excape into the condensation space 4 too quickly, the orifice plate 30 is arranged at the mouth of the steam equalization line 29.

It is appropriate if subsequent deaerating by means of fresh or bleed steam remains operative up to approximately 30 to 40% of the load, that is to say until the vacuum pump 47 is capable by itself of preventing accumulations of air. However, in the case of poor condenser designs which have zones with unavoidable air pockets even in normal load operation, it will not be possible to do without permanent subsequent deaerating. It may be mentioned purely incidentally that the quantity of steam requred for this purpose is not available for expansion in the turbine or for preheating.

On the precondition that the condenser design is a good one, therefore, the supply of steam via the steam feed line 37 is cut off during the normal load operation meanwhile assumed. The feed water recirculation line 39, the nitrogen lines 38 and 51, and the secondary cooling water 49 are, of course, also inoperative. It was already mentioned further above that it is advantageous if the vacuum deaerator 19 is also switched off above a certain low load.

A further advantage of the circuit, during normal operation, is that the content of the cold-condensate vessel 14 can undergo continuous purification. The existing circulation system (namely the cold-condensate vessel 14, the cold-condensate line 16, the condenser 3, the condensate pump 8, the condenser purification apparatus 9, and the condensate return 24) is suitable precisely for this purpose. Since approximately 1% of the circulation quantity has to be replaced constantly in any case, it is advantageous to increase this quantity in the cold-condensate line 16 to, for example, 6%, and to draw off approximately 5% of the water flowing through the condensate purification apparatus 9 again upstream of the hot-well regulating valve 10, through the condensate return 24.

Of course, the invention is not restricted to the exemplary embodiment described. As an alternative to the primary possibility of deaerating via the feed water recirculation line 39, as shown, recirculation could also be carried out via a minimum-rate line 52 (shown by a broken line) downstream of the feed pump 12 or via a minimum-rate line 53 (also shown by a broken line) downstream of the condensate pump 8. Even in these cases (which are not as advantageous as the examplary embodiment, because impurities in the preheater train are detected only partially, if at all), the water is introduced into the hot well 6 below the water level 7.

What is claimed is:

1. A process for purifying and deaerating the condensate/feed water in the circulation system of a power generating plant comprising:
    (a) a main circuit comprising:
        (i) a steam generator for producing saturated steam;
        (ii) a turbine connected to said steam generator, in which turbine the saturated steam is expanded;
        (iii) a main condenser connected to said turbine, in which main condenser the expanded steam is precipitated on water cooled tube bundles located in a condensation space of said main condenser, said condensation space further containing air coolers and being separated by an intermediate bottom from a condensate-collecting vessel, said condensation space and said condensate-collecting vessel being in fluid communication with one another via a syphon through which condensate flows downwardly from said condensation space to said condensate-collecting vessel and a steam equilization line through which steam flows upwardly from said condensate-collecting vessel to said condensation space;

(iv) a condensate pump conveying the condensate from said condensate-collecting vessel through a condensate purification apparatus to a low-pressure preheater;

(v) a feed pump conveying the condensate from said low-pressure preheater through a high-pressure preheater to said steam generator; and (vi) a steam-generator isolating valve upstream of said steam generator and downstream of said high-pressure preheater;

(b) a secondary circuit fluidically connected to said main circuit downstream of said condensate purification apparatus and upstream of said low-pressure preheater, said secondary circuit comprising a cold-condensate vessel; and (c) a third circuit fluidically connected to said air coolers and to said condensation space, said third circuit comprising:

(i) a vacuum pump for drawing off the air/steam mixture from said air coolers;

(ii) a secondary condenser disposed in a venting line upstream of said vacuum pump; and (iii) a second line for returning condensed fluid from said secondary condenser to said main condenser, said process comprising the steps of:

(d) closing said steam-generator isolating valve;

(e) filling said low-pressure preheater and said high-pressure preheater with water extracted from said cold-condensate vessel and introduced into said low-pressure preheater and said high-pressure preheater via said condensate-collecting vessel;

(f) circulating the water in said low-pressure preheater and said high-pressure preheater several times through said condensate-collecting vessel and said condensate purification apparatus;

(g) introducing a deaerating medium into said condensate-collecting vessel below the water level therein and allowing the deaerating medium to rise through the water and to flow into a deaerating chamber in said condensate-collecting vessel, where the deaerating medium displaces the air located in said deaerating chamber and forms a cushion that is conducive to oxygen deaerating;

(h) conveying the steam and air displaced from said deaerating chamber into said condensation space;

(i) conveying steam and air from said air coolers through said venting line to said secondary condenser; and (j), following the start of steam generation and during the initial low-load period, carrying out subsequent deaerating of condensate by means of steam flowing upwardly from said condensate-collecting vessel to said condensation space through said steam equilization line and condensate flowing downwardly from said condensation space to said condensate-collecting vessel through said syphon.

2. A process as recited in claim 1 wherein the water from said high-pressure preheater is conveyed to said condensate-collecting vessel through a feed water recirculation line that branches off from said main circuit between said high-pressure preheater and said steam-generator isolating valve.

3. A process as recited in claim 1 wherein the water from said low-pressure preheater is conveyed to said condensate-collecting vessel through a line that branches off from said main circuit between said feed pump and said high-pressure preheater.

4. A process as recited in claim 1 wherein the water from said condensate purification apparatus is conveyed by said condensate pump to said condensate-collecting vessel through a line that branches off from said main circuit between said condensate purification apparatus and said low-pressure preheater.

5. A process as recited in claim 1 wherein the deaerating medium is an inert gas.

6. A process as recited in claim 1 wherein the deaerating medium is auxiliary steam.

7. A process as recited in claim 1 wherein the deaerating medium is the water that is circulated to said condensate-collecting vessel and that is heated above its saturation temperature in said condensate-collecting vessel as a result of multiple circulations.

8. A process as recited in claim 1 wherein secondary cooling water is provided to said secondary condenser at a temperature lower than the main cooling water is provided to said main condenser.

9. A process as recited in claim 1 wherein:

(a) the steam for subsequent deaeration is bleed steam from said turbine that is conveyed into said deaerating chamber in said condensate-collecting vessel and (b) packing inserts are disposed in said condensate-collecting vessel downstream of said syphon in position so that the steam from said turbine passes upwardly through said packing inserts while condensate from said syphon drips downwardly through said packing inserts.

10. A process as recited in claim 1 wherein the steam for subsequent deaeration is live steam that is introduced into said condensatecollecting vessel below the water level therein.

11. A process as recited in claim 1 wherein, prior to the time that said main circuit is filled with water, the water is freed of oxygen in a vacuum deaerator and stored in said cold-condensate vessel, the water surface in said cold condensate vessel being provided with an inert-gas atmosphere.

12. Apparatus for purifying and deareating the condensate/feed water in the circulation system of a power generating plant, said apparatus comprising:

(a) a main circuit comprising:

(i) a steam generator for producing saturated steam;

(ii) a turbine connected to said steam generator, in which turbine the saturated steam is expanded;

(iii) a main condenser connected to said turbine, in which main condenser the expanded steam is precipitated on water cooled tube bundles located in a condensation space of said main condenser, said condensation space further containing air coolers and being separated by an intermediate bottom from a condensate-collecting vessel, said condensation space and said condensate-collecting vessel being in fluid communication with one another via a syphon through which condensate flows downwardly from said condensation space to said condensatecollecting vessel and a steam equilization line through which steam flows upwardly from said condensate-collecting vessel to said condensation space;

(iv) a condensate pump conveying the condensate from said condensate-collecting vessel through a condensate purification apparatus to a low-pressure preheater;
(v) a feed pump conveying the condensate from said low-pressure preheater through a high-pressure preheater to said steam generator; and
(vi) a steam-generator isolating valve upstream of said steam generator and downstream of said high-pressure preheater;
(b) a secondary circuit fluidically connected to said main circuit downstream of said condensate purification apparatus and upstream of said low-pressure preheater, said secondary circuit comprising a cold-condensate vessel; and
(c) a third circuit fluidically connected to said air coolers and to said condensation space, said third circuit comprising:
(i) a vacuum pump for drawing off the air/steam mixture from said air coolers;
(ii) a secondary condenser disposed in a venting line upstream of said vacuum pump; and
(iii) a second line for returning condensed fluid from said secondary condenser to said main condenser.

* * * * *